Dec. 31, 1963  G. L. HERSHMAN ETAL  3,116,075
THREE POINT IMPLEMENT HITCH QUICK ATTACHING DEVICE
Filed April 6, 1961  4 Sheets-Sheet 1

Inventors
Gordon L. Hershman
Charles W. Doering
Paul O. Pippel
Attorney

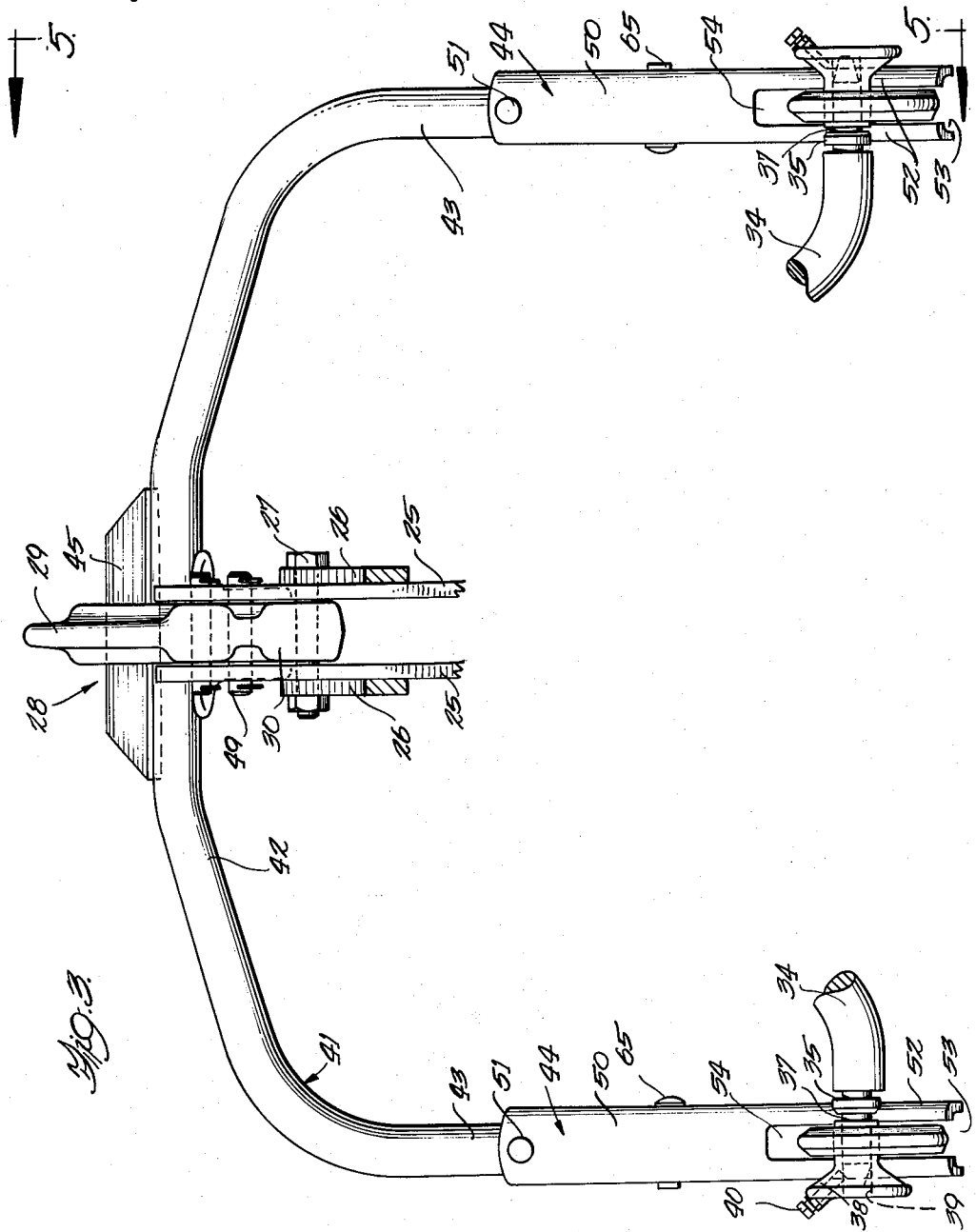

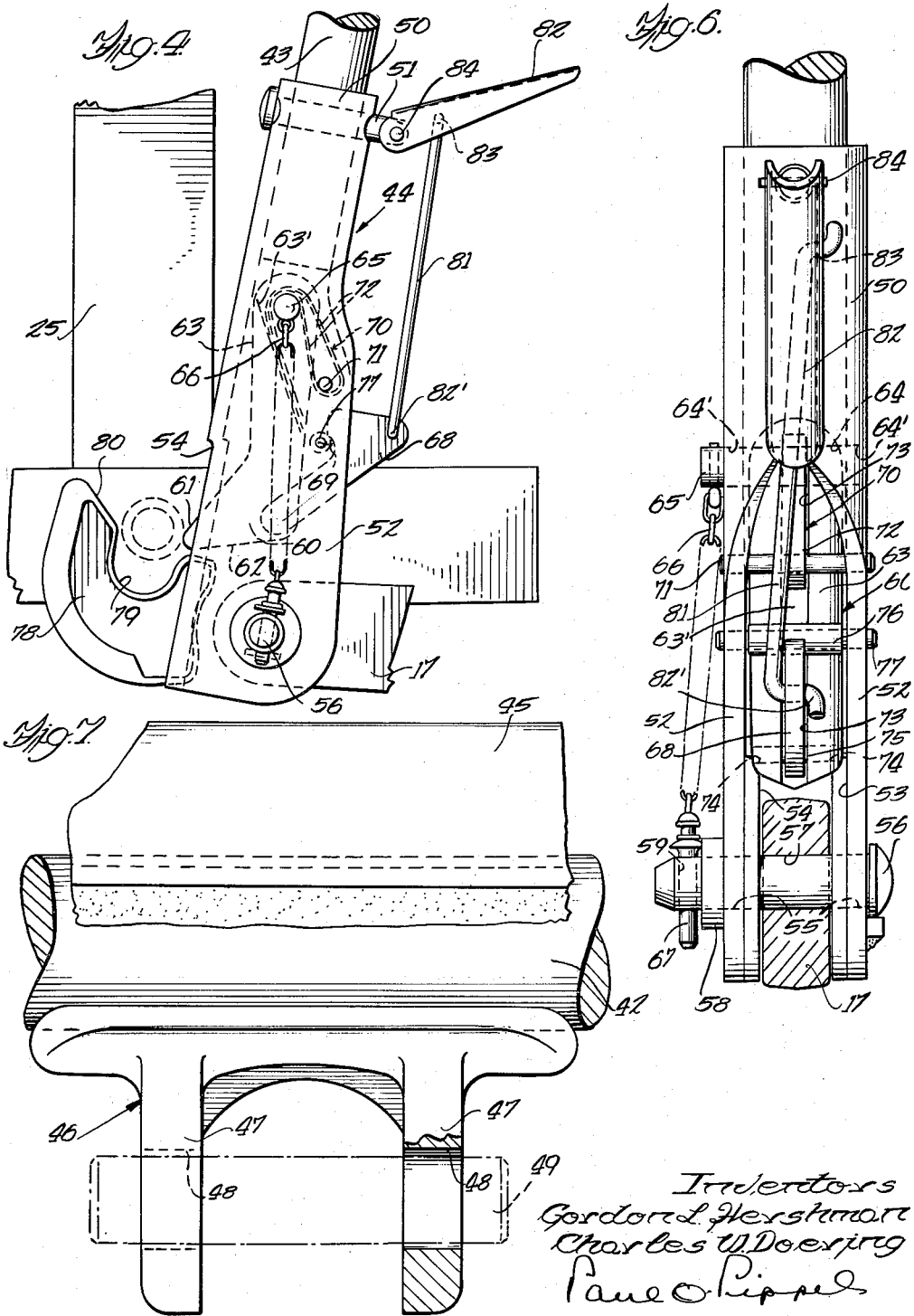

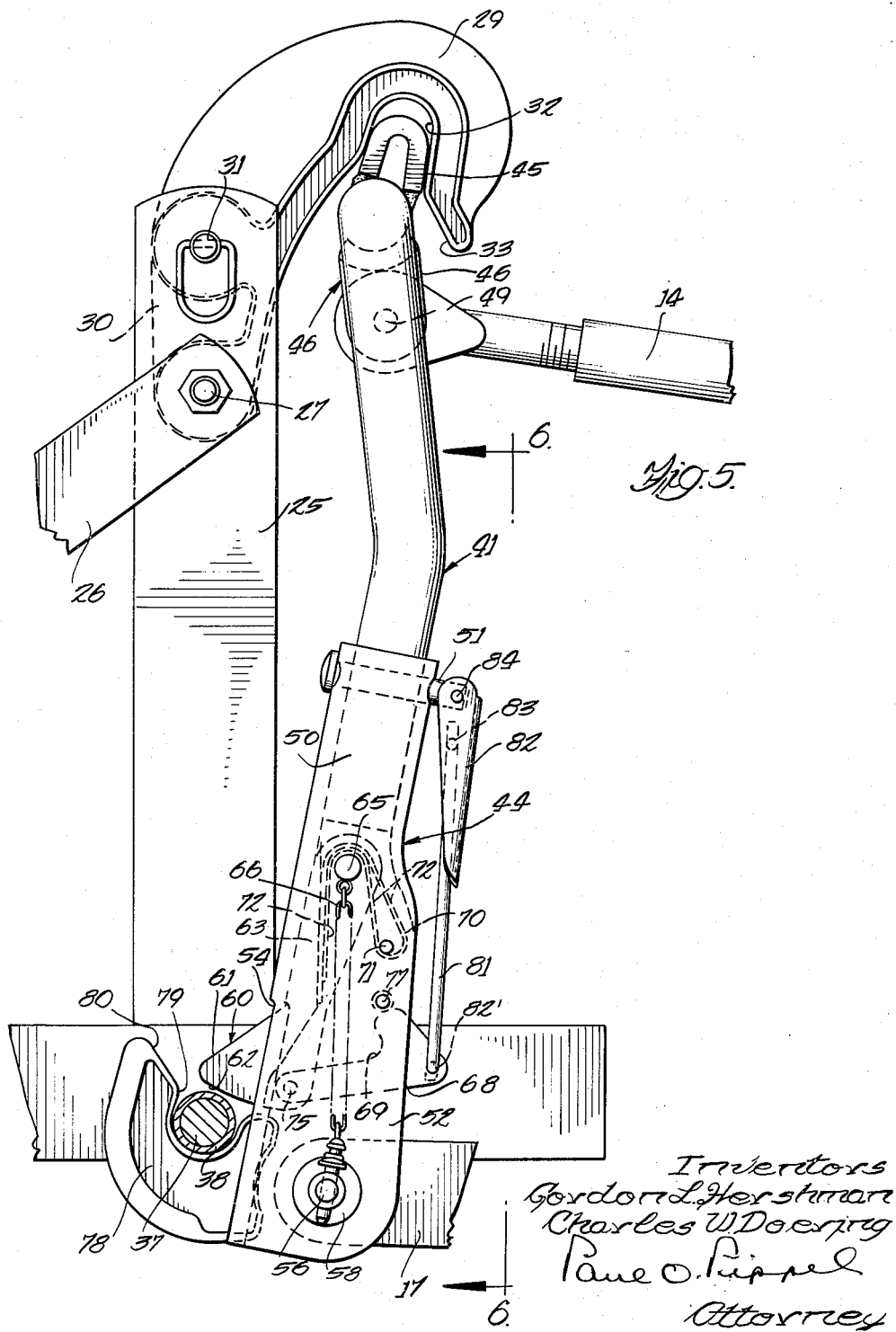

United States Patent Office 3,116,075
Patented Dec. 31, 1963

3,116,075
THREE POINT IMPLEMENT HITCH QUICK
ATTACHING DEVICE
Gordon L. Hershman, La Grange, and Charles W.
Doering, Westchester, Ill., assignors to International
Harvester Company, Chicago, Ill., a corporation of
New Jersey
Filed Apr. 6, 1961, Ser. No. 101,196
10 Claims. (Cl. 280—479)

This invention relates to a quick attachable implement hitch for attaching an implement to a tractor by means of a three-link trailing linkage connection.

A prime object of this invention is to provide an improved quick attaching device for quickly connecting an implement to a tractor without the necessity of having the operator dismount for the purpose of making the connection.

Still another object is to provide an improved three-point quick attaching device whereby the operator can effectively and positively effectuate connection of the implement to the tractor through a three-point linkage system.

A still further object of this invention is to provide an improved three-point quick attaching device for attaching an implement to a tractor, the said device including a positive latching mechanism which can be moved to a release position by the operator on the tractor and which will automatically engage portions on the implement to provide a positive lock during the connection of the hitch with a three-point linkage connection without the necessity of further manual manipulation of the latch elements by the operator on the tractor.

Still another object is to provide an improved quick attachable implement hitch for attaching a farm implement to a three-point linkage connection of a tractor, the said device including a latching mechanism for positively connecting the lower links of the hitch system by means of a latching device automatically actuated to an engageable position during the disconnection of the links with the implement.

Still another object is to provide an improved hitch connection for connecting a farm implement to a pair of laterally spaced trailing links and to an upper single link pivotally connected to a tractor frame, the said hitch connection including latch mechanisms for connecting the lower links in locked relation with respect to the farm implement, the said latch mechanisms being enclosed in suitable housings whereby they are protected from possible damage during use and thus service-free operation is assured.

Other more specific objects of this invention will become apparent from a reading of the detailed description, taken in connection with the accompanying sheet of drawings.

In the drawings:

FIGURE 3 is an enlarged cross-sectional view taken along the line 3—3 of FIGURE 1;

FIGURE 4 is an enlarged side elevational view of a lower portion of an implement hitch showing a disengaging position of a latching mechanism;

FIGURE 5 is a side elevational view of an implement hitch showing a bearing attachment in section, taken substantially along the line 5—5 of FIGURE 3;

FIGURE 6 is a rear fragmentary view of the lower leg of a hitch mechanism showing a latching mechanism and being taken substantially along the line 6—6 of FIGURE 5; and FIGURE 7 is an enlarged detailed view showing portions of an upper transverse member of a hitch mechanism including an attaching bracket.

Figure 1:
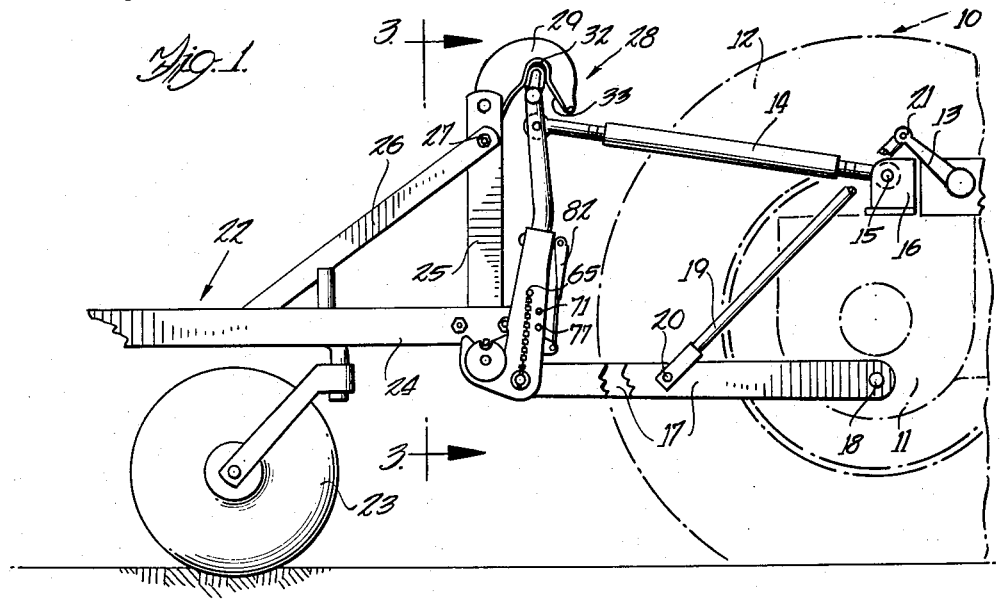
FIGURE 1 is a side elevational view of an improved quick attachable and detachable implement hitch showing the rear portion of a tractor and a three-point trailing link arrangement connected to the front portion of a trailing implement.
Figure 2:
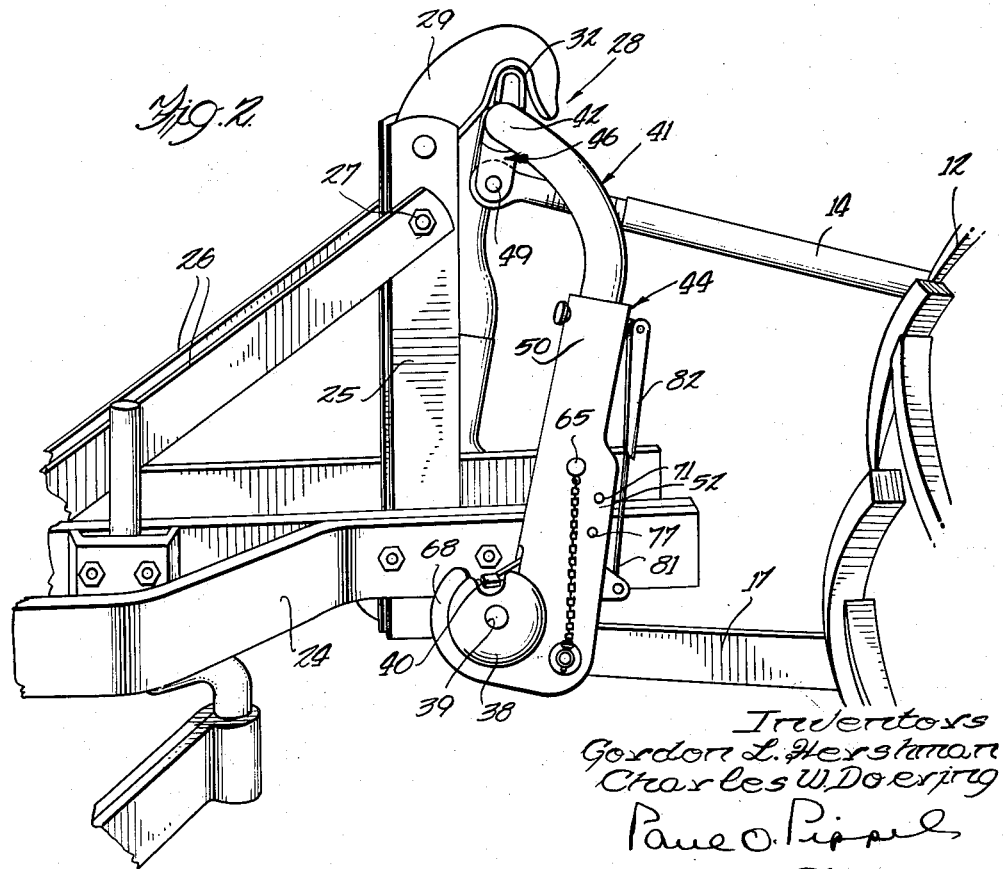
FIGURE 2 is a perspective view showing the improved implement hitch.

Referring now particularly to FIGURE 1, a rear portion of a tractor is designated by the reference character 10, the said tractor including a rear axle housing 11 suitably supported on ground wheels 12. The rear axle housing 11 is also provided with power lift arms, only one of which is shown, the said arms 13 being disposed on opposite sides of the housing 11 and being independently actuated by suitable hydraulic mechanism (not shown) for moving the said arms 13 in clockwise and counterclockwise directions.

The tractor 10 is provided to accommodate a three-point hitch and thus is provided with an upper adjustable trailing link 14 which is pivotally connected as indicated at 15 to a bracket 16 mounted on the rear axle housing 11. A pair of lift or trailing links 17 are transversely spaced and are connected to the lower portion of the axle housing 11 by means of pivot connections 18. A pair of transversely spaced lifting links 19 (only one of which is shown) are each suitably connected by means of pivotal connections 20 to the trailing links 17. The upper ends of the links 19 are suitably pivotally connected to the arms 13 as indicated at 21.

A trailing implement is generally designated at 22, the said trailing implement 22 being provided with one or more suitable ground engaging tools 23. The ground engaging tools 23 are connected to a longitudinally extending implement frame 24 having at its forward end a pair of upwardly extending plates forming a bracket designated at 25. A pair of diagonal struts 26 are suitably connected at their lower ends to the frame 24 and have their upper ends securely connected to the bracket 25 by means of a bolt and nut connection 27.

An implement hitch of the three-point type is generally designated by the reference character 28. The implement hitch 28 comprises a hook-shaped member 29, having, as best shown in FIGURE 3, an attaching portion 30 which by means of a suitable pin 31 is connected to the bracket 25. The attaching portion 30 is also suitably connected to the bracket 25 by means of the bolt and nut connection 27. The hook member 29 includes an engaging recess or slot 32 and the hook also is provided with a guide face 33.

Referring now particularly to FIGURE 3, a pair of transversely spaced bracket members 34 are mounted on and project laterally outwardly from the implement 22. The bracket members 34 are suitably rigidly connected to the frame 24. Each of the bracket members 34 is provided with a spacer 35 and includes outwardly projecting cylindrical connecting portions 37. A retaining collar or implement attaching bearing is designated at 38 and one of these is suitably connected to each of the cylindrical connecting portions 37. Each retaining collar 38 comprises a bore 39 which receives each cylindrical connecting portion 37. A set screw 40 threaded into each retaining collar 38 suitably secures the same to each connecting portion 37.

The hitch 28 comprises a U-shaped, or bail-shaped hitch member generally designated at 41 and best shown in FIGURE 3. The U-shaped member 41 is provided with a generally horizontal or transversely extending cylindrical connecting portion 42 having downwardly projecting laterally spaced cylindrical integral legs 43. A latch housing 44 is connected to each of the legs 43. As best shown in FIGURES 3, 5, and 7, the connecting member 42 has suitably connected thereto, by welding as indicated, a V-shaped member 45 which in effect provides an upwardly projecting ridge having considerable transverse width and being adapted to engage the recess 32. As shown in FIGURE 5, the V-shaped member 45 is disposed at an angle with respect to the vertical center line of the legs 43 so as to conform with the angular disposition of the recess 32. A downwardly projecting bracket 46 is suitably connected to the connecting portion 42 and includes depending portions 47 having aligned bores 48. A pin 49 connects the link 14 to the bracket 46.

Each housing 44 is provided at its upper end with a tubular portion 50 receiving the lower ends of the leg portions 43 in telescoping relation. The housing 44 further comprises transversely spaced upwardly extending sidewalls 52. A pin 51 extends through the upper end of each tubular portion 50 and through each of the legs 43, and the lower sidewalls 52 are spaced apart to provide a rear opening 53 and a front opening 54. As best shown in FIGURE 6, the walls 52 are provided at their lower ends with aligned openings 55 through which a pin 56 extends. The pin 56 also projects through a bore 57 formed in each of the links 17. A spacer 58 is provided on the pin 56, the said pin also including a vertically extending bore 59. A foot-shaped latch element is designated at 60. The said element 60 is provided with a downwardly and outwardly tapering surface 61 and a lower latching surface 62. The latch element 60 also includes a vertical portion 63 having a bore 64, as shown in FIGURE 6, in alignment with openings 64' provided through the tubular portion 50. A pin 65 extends through the openings 64' and through the bore 64. A chain 66 extends downwardly from the pin 65 and is connected to a locking pin 67 extending through the bore 59 of the pin 56.

A locking lever or element 68 is provided with an arcuate locking seat 69, best shown in FIGURES 4 and 5. As best shown in FIGURES 4, 5, and 6, a leaf spring is designated at 70. An anchor pin 71 extends through the sidewalls 52 and the spring 70 extends around the pin 71, and includes leaves 72 which are disposed in a slot 73 in the member 63 and which engage an angled portion 63' of the latch element 60 to urge the tapering surface 61 and latching surface 62 into the closed position shown in FIGURE 5. As shown in FIGURE 6, the latch element 60 also includes aligned bores 74 which receive a pin 75 to which the cocking lever 68 is pivotally connected. A sleeve or stop member 76, as shown in FIGURE 6, is disposed between the sidewalls 52 and a pin 77 extends through the sleeve 76 and the sidewalls 52 to suitably connect the sleeve in position within the housing 44.

A hook-shaped finger 78 suitably connected to the walls 52 is connected to each housing 44 and projects rearwardly with respect to the tractor as best shown in FIGURES 1, 4, and 5. Each hook-shaped finger 78 includes an upwardly extending notch 79. The finger 78 also includes a guide surface 80.

The locking lever 68 is manually movable by means of a link 81 pivotally connected to a lever 82 as indicated at 83. The lever 82 is pivotally connected to the pin 51 by means of a pivot pin 84 and the lower end of the link 81 is pivotally connected to the lever 68 by means of a pivot pin 82'.

*The Operation*

Assuming that the implement 22 has been attached to the tractor as shown in FIGURE 5, it is now desired to disengage the hitch 28 from the implement attaching bearings 38. In this position, of course, the latch element 60 keeps the bearings 38 positively engaged. The operator on the tractor now pivots the lever 82 in a counterclockwise direction whereupon the latch elements 60, in FIGURE 5, are moved to the right or in a counterclockwise direction whereupon the locking levers 68 have their locking seats 69 placed into engagement with the stops 76 and the latching element 61 is moved to the position shown in FIGURE 4. The links 17 are now lowered away from the implement attaching bearings 38. The attaching bearings 38 are now removed from the notches 79 and during this movement the bearings 38 engage the projecting tip immediately below the tapering surface 61 of the latch element 60 to further move the latch element 60 to the right whereupon the locking lever 68, link 81, and lever 82 drop by gravity and as the bearing elements 38 are completely disengaged from the notches 79 by the lowering of the links 17, the latch element 60 is now again free, to be urged by the spring 70, again over the notches 79 and in the position shown in FIGURE 5. In other words, in this position the latch elements 60 are in a position again for engaging the bearing elements 38 to hitch the implement to the tractor.

During this disengagement of the implement bearings 38 the ridge 45 also has been lowered out of engagement with the recess 32 of the hook 29. Thus, the only manual manipulation on the part of the operator has been the operation of initially moving the latching element into the position shown in FIGURE 4, whereupon the latching element is in a locked position with the tip projecting and whereupon immediately thereafter as the bearing elements 38 are further released, the tip is engaged and the locking lever 68 is again released to place the latching elements into position for subsequent reengagement.

To effectuate reengagement with the implement the links 17 are again raised whereupon the bearing elements 38 initially engage the tapering surfaces 61 to force the latching elements 60 in a counterclockwise direction or to the right, as shown in FIGURE 5, against the action of the springs 70 whereupon the bearing members 38 are engaged in the recesses 79 of the hooks 78 whereupon the spring immediately again urges the latch element 60 into the locked or latched position shown in FIGURE 5. At this time, the ridge 45 also engages the surface 33 of the hook 29 and slides into the recess 32 to effectuate the three-point connection.

Thus it is believed clear that a simplified and yet very effective and positive implement hitch attachment has been provided which can be very simply attached and detached from the operator's station by means of a single manual operation. This manual operation merely is the operation of initially moving the locking lever 68 to the position shown in FIGURE 4 during the disengagement procedure. Immediately during this engagement the latch elements 60 are again moved into position for automatically providing latching of the implement as desired. Furthermore, the single hook element 29 positively and effectively is engaged even though slight misalignment may occur during the connecting function since the tapering surface 33 guides the ridge 45 into the recess 32 in each case. It is to be noted that the ridge 45 has a substantial transverse width so that it will accommodate slight misalignments which may occur during the operation of attaching and detaching.

Furthermore, it is believed clear from the description that the housing, which contains the latch mechanism, provides a latching mechanism free of malfunction since it is completely enclosed and thus the parts, comprising the latching mechanism, will remain in proper operative function and alignment. Furthermore, the housing in each case protects the latch mechanism from extraneous shocks, against the entrance of dirt and other matter, and from accidental breakage. Therefore, continued function, free of service is assured.

Thus it is believed that the objects of the invention have been achieved and that an improved three-point hitch attachment has been disclosed. It must be understood that changes and modifications may be made without departing from the spirit of the invention as disclosed or from the scope thereof as defined in the appended claims.

What is claimed is:

1. An implement hitch for attaching a pull-behind implement to a tractor having first and second laterally spaced vertically movable trailing links pivotally mounted on the tractor, a third trailing link pivotally connected to said tractor above said first and second links, and means on said tractor connected to said links for raising and lowering said links; comprising a generally bail-shaped member having a connecting portion extending transversely between said first and second links, means pivotally connecting said third link to said connecting portion, a pair of legs on said bail-shaped member projecting downwardly from said connecting portion, each of said legs having adjacent its lower end a hook-shaped finger including a notch opening upwardly, a latch housing including a pair of laterally spaced sidewall members connected to the lower end of each leg, means pivotally connecting said first and second links to said sidewall members, a latch element pivotally connected to said housing between said sidewall members, said latch element having an upper inwardly tapering surface, and a lower latching surface, an L-shaped locking element pivotally connected to said latch element, said locking element having a locking seat, spring means normally urging said latch element to a first position whereby said tapering and latching surfaces are disposed over said notch of said fingers, a lock member disposed between said sidewall members above the pivotal connection of said locking element, means connected to said locking element to move the same into position whereby said locking seat engages said lock member to retain said latch element in a second position with only a portion of said latching surface projecting in proximity to said notch of said finger, a hook-shaped member having an open end engaging recess opening downwardly, said hook-shaped member being attachable to said pull-behind implement, and a transversely extending engaging member projecting upwardly from said connecting portion, a pair of laterally spaced implement bearing attachments attached to said pull-behind implement, said finger notches being adapted to receive said bearing attachments and the recess of said hook-shaped member being adapted to receive said transversely extending engaging member during the first position of said latch element.

2. An implement hitch for attaching a pull-behind implement to a tractor having first and second laterally spaced vertically movable trailing links pivotally mounted on the tractor, a third trailing link pivotally connected to said tractor above said first and second links, and means on said tractor connected to said links for raising and lowering said links; comprising a generally bail-shaped member having a connecting portion extending transversely behind said first and second links, means pivotally connecting said third link to said connecting portion, a pair of legs on said bail-shaped member projecting downwardly from said connecting portion, each of said legs having adjacent its lower end a hook-shaped finger including a notch opening upwardly, a latch housing including a pair of laterally spaced sidewall members connected to the lower end of each of said legs, means pivotally connecting said first and second links to said sidewall members, a latch element pivotally connected to said housing between said sidewall members, said latch element having an upper inwardly tapering surface, and a lower latching surface, an L-shaped locking element pivotally connected to said latch element, said locking element having a locking seat, spring means normally urging said latch element to a first locking and engaging position with respect to said notch of said fingers, a lock member disposed between said sidewall members above the pivotal connection of said locking element, means connected to said locking element to move the same into position whereby said locking seat engages said lock member to retain said latch element in a second position with a portion of said tapering surface projecting in proximity to said notch of said finger, a hook-shaped member having an open end engaging recess opening downwardly, said hook-shaped member being attachable to said pull-behind implement, and a transversely extending engaging member projecting upwardly from said connecting portion, a pair of laterally spaced element bearing attachments attached to said pull-behind implement, said finger notches being adapted to receive said spaced implement bearing attachments and the recess of said hook-shaped member being adapted to receive said transversely extending engaging member during the second position of said latching element.

3. An implement hitch for attaching a pull-behind implement to a tractor having first and second laterally spaced vertically movable trailing links pivotally mounted on the tractor, a third trailing link pivotally connected to said tractor above said first and second links, and means on said tractor connected to said links for raising and lowering said links; comprising a generally bail-shaped member having a connecting portion extending transversely between said first and second links, means pivotally connecting said third link to said connecting portion, a pair of legs on said bail-shaped member projecting downwardly from said connecting portion, each of said legs having adjacent its lower end a hook-shaped finger including a notch opening upwardly, a latch housing connected to the lower end of each of said legs, means pivotally connecting said first and second links to said housing, a latch element disposed within and pivotally connected to said housing, said latch element having an upper inwardly tapering surface, and a lower latching surface, a locking element pivotally connected to said latch element, said locking element having a locking seat, spring means normally urging said latch element to a first position whereby said latch element is disposed in a first position over said notch of said fingers, a lock member disposed within and secured to said housing above the pivotal connection of said locking element, means connected to said locking element to move the same into position whereby said locking seat engages said lock member to retain said latch element in a second position with a portion of said tapering surface projecting in proximity to said notch of said finger, a hook-shaped member having an open end engaging recess opening downwardly, said hook-shaped member being attachable to said pull-behind implement, and a transversely extending engaging member projecting upwardly from said connecting portion, a pair of laterally spaced implement bearing attachments attached to said pull-behind implement, said finger notches being adapted to receive said spaced implement bearing attachments and the recess of said hook-shaped member being adapted to receive said transversely extending engaging member during the first position of said latch element.

4. An implement hitch for attaching a pull-behind implement to a tractor having first and second laterally spaced vertically pivotal trailing links pivotally mounted on the tractor, a third trailing link pivotally connected to said tractor, and means for raising and lowering said links; comprising an inverted generally U-shaped member having a transversely extending upper portion and a pair of downwardly extending legs, means pivotally connecting said links to said U-shaped member, a hook-shaped finger connected to each leg including a notch opening upwardly, a pair of laterally spaced implement bearing attachments connected to said implement, each notch being adapted to receive one of said implement bearing attachments, a latch mechanism on each leg cooperating with each notch, each latch mechanism comprising a latch element pivotally connected to said leg for pivotal movement about a transverse axis, a latching portion on said latch element, means urging said latch element in one direction to a closed position relative to said notch, a locking lever pivotally connected to said latch element for pivotal movement about a transverse axis, said lever having an upwardly projecting portion providing a retaining means, a stop on each leg, means for pivoting said lever whereby said retaining means engages said stop to retain said latch element in an open position relative to said notch, said latching portion in said open position being engageable by one of said bearing attachments during disengagement of the same with said finger to move said latch element in an opposite direction whereby said lever is released by gravity from said stop and said latch element is returned to said closed position, an upwardly extending ridge on said transversely extending upper portion, and a hook adapted to be mounted on said implement and engaging said ridge.

5. An implement hitch in accordance with claim 4, said means for pivoting said locking lever comprising a second lever pivotally connected to each of said legs, and a link pivotally connected to each of said levers.

6. An implement hitch for attaching a pull-behind implement to a tractor having first and second laterally spaced vertically pivotal trailing links pivotally mounted on the tractor, a third trailing link pivotally connected to said tractor, and means for raising and lowering said links; comprising an inverted generally U-shaped member having a transversely extending upper portion and a pair of downwardly extending legs, means pivotally connecting said links to said U-shaped member, a hook-shaped finger connected to each leg including a notch, a pair of laterally spaced implement bearing attachments connected to said implement, each notch being adapted to receive one of said implement bearing attachments, a latch mechanism on each leg cooperating with each notch, each latch mechanism comprising a latch element pivotally connected to said leg for pivotal movement about a transverse axis, a latching portion on said latch element, means urging said latch element in one direction to close said notch, a locking lever pivotally connected to said latch element for pivotal movement about a transverse axis, said locking lever having a retaining means, a stop on each leg, means for pivoting said locking lever whereby said retaining means engages said stop to retain said latch element in an open position, said latching portion being engageable by one of said bearing attachments during disengagement of the same with said finger to move said latch element in an opposite direction whereby said lever is released by gravity from said stop and said latch element is moved to a closed position, an upwardly extending ridge on said transversely extending upper portion, and a hook adapted to be mounted on said implement and engaging said ridge.

7. An implement hitch for attaching an implement to a tractor having first and second laterally spaced pivotal trailing links pivotally mounted on the tractor, a third trailing link pivotally connected to said tractor, and means for raising and lowering said links; comprising an inverted generally U-shaped member having a transversely extending upper portion and a pair of downwardly extending legs, means pivotally connecting said links to said U-shaped member, a hook-shaped finger connected to each leg including a notch, a pair of laterally spaced implement bearing attachments connected to said implement, each notch being adapted to receive one of said implement bearing attachments, a latch mechanism on each leg cooperating with each notch, each latch mechanism comprising a latch element pivotally connected to said leg for pivotal movement about a transverse axis, a latching portion on said latch element, means urging said latch element in one direction to close said notch, a locking lever pivotally connected to said latch element for pivotal movement about a transverse axis, said locking lever having a retaining means, a stop on each leg, means for pivoting said locking lever whereby said retaining means engages said stop to retain said latch element in an open position, said latching portion being engageable by one of said bearing attachments during relative movement of the same with respect to said finger to move said latch element in an opposite direction whereby said lever is released from said stop and said latch element is moved to a closed position, and means connecting said upper portion to said implement.

8. An implement hitch for attaching an implement to a tractor having first and second laterally spaced trailing links movable to raised and lowered positions; comprising a frame having a transverse portion and transversely spaced vertically extending legs, means pivotally connecting said first and second links to said legs, a hook-shaped finger connected to each leg, each finger having a notch, a pair of laterally spaced implement bearing attachments on said implement, each said notch being adapted to receive one of said implement bearing attachments, a latch mechanism on each leg cooperating with each notch, each latch mechanism comprising a latch element pivotally connected to said leg for pivotal movement, means urging said latch element to close said notch, a locking lever pivotally connected to said latch element, means on said leg engageable with said lever to retain said latch element in a position whereby said latch element is in a partially closed position relative to said notch, whereby during relative movement of one of said bearing attachments and said notch, said latch mechanism is moved away from said notch, said lever is released from engagement with said means on said leg and said latch element is moved to a closed position, and means adapted to releasably connect said transverse portion to said implement.

9. An implement hitch in accordance with claim 8, said latch mechanism including manually operable means connected to said locking lever for moving said lever into position whereby said latch element is in said partially closed position.

10. An implement hitch for attaching an implement to a tractor having first and second laterally spaced trailing links and a third link disposed above said first and second links, said links being movable to raised and lowered positions, comprising a frame having a transverse portion and transversely spaced vertically extending legs, means pivotally connecting said first and second links to said legs, means pivotally connecting said third link to said transverse portion, a hook-shaped finger connected to each leg, each finger having a notch, a pair of laterally spaced implement bearing attachments on said implement, each said notch being adapted to receive one of said implement bearing attachments, a latch mechanism on each leg cooperating with each notch, each latch mechanism comprising a latch element pivotally connected to said leg for pivotal movement, means urging said latch element to close said notch, a locking lever pivotally connected to said latch element, means on said leg engageable with said locking lever to retain said latch element in a partially closed position relative to said notch, whereby during relative movement of one of said bearing attachments and said notch, said latch mechanism is moved away from said notch, said locking lever is released from engagement with said means on said leg and said latch element is moved to a closed position, and means adapted to releasably connect said transverse portion to said implement.

References Cited in the file of this patent

UNITED STATES PATENTS

| | | |
|---|---|---|
| 860,763 | Olsen | July 23, 1907 |
| 967,713 | Blom | Aug. 16, 1910 |
| 2,979,137 | Hess | Apr. 11, 1961 |